United States Patent
Delaney et al.

(10) Patent No.: US 11,431,721 B2
(45) Date of Patent: Aug. 30, 2022

(54) SYSTEM AND METHOD FOR CONTROLLING COMMUNICATION PERMISSIONS

(71) Applicant: Lenovo (Singapore) Pte. Ltd., New Tech Park (SG)

(72) Inventors: Mark Patrick Delaney, Raleigh, NC (US); John Carl Mese, Cary, NC (US); Russell Speight VanBlon, Raleigh, NC (US); Nathan J. Peterson, Oxford, NC (US); Arnold S. Weksler, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 115 days.

(21) Appl. No.: 17/143,055

(22) Filed: Jan. 6, 2021

(65) Prior Publication Data

US 2022/0217145 A1    Jul. 7, 2022

(51) Int. Cl.
| | |
|---|---|
| *H04L 9/40* | (2022.01) |
| *H04W 48/02* | (2009.01) |
| *H04W 12/61* | (2021.01) |
| *H04L 67/55* | (2022.01) |

(52) U.S. Cl.
CPC ............ *H04L 63/102* (2013.01); *H04L 67/55* (2022.05); *H04W 12/61* (2021.01); *H04W 48/02* (2013.01)

(58) Field of Classification Search
CPC ..... H04L 63/102; H04L 63/107; H04W 12/60
See application file for complete search history.

(56) References Cited

U.S. PATENT DOCUMENTS

| | | | | |
|---|---|---|---|---|
| 2003/0095540 | A1* | 5/2003 | Mulligan | H04L 67/563 370/352 |
| 2004/0243941 | A1* | 12/2004 | Fish | H04W 4/06 715/752 |
| 2007/0204326 | A1* | 8/2007 | Booking | H04L 63/20 726/1 |
| 2009/0047937 | A1* | 2/2009 | Zellner | H04L 63/0407 455/414.1 |
| 2010/0199188 | A1* | 8/2010 | Abu-Hakima | H04W 4/02 709/224 |
| 2011/0314145 | A1* | 12/2011 | Raleigh | H04W 48/16 709/224 |
| 2013/0144974 | A1* | 6/2013 | Haakenson | H04L 67/55 709/217 |
| 2017/0302750 | A1* | 10/2017 | Greenberger | H04L 67/55 |
| 2020/0374356 | A1* | 11/2020 | Bejar | G06F 40/30 |
| 2020/0380171 | A1* | 12/2020 | Bonat | G06F 21/6254 |

* cited by examiner

*Primary Examiner* — Ponnoreay Pich
(74) *Attorney, Agent, or Firm* — The Small Patent Law Group LLC; Dean D. Small (57) ABSTRACT

An electronic device is provided that includes a processor, and a data storage device having executable instructions accessible by the processor. Responsive to execution of the instructions, the processor receives candidate network based notifications. For each of the candidate network based notifications, the processor blocks communication of the candidate network based notifications to a user of the electronic device based on user permissions. The processor also obtains context data related to the user, modifies the user permissions based on the context data and determines a period for utilizing modified user permissions, and resets the user permissions after the period.

20 Claims, 4 Drawing Sheets

SYSTEM AND METHOD FOR CONTROLLING COMMUNICATION PERMISSIONS

BACKGROUND

Embodiments herein generally relate to systems and methods for controlling and modifying communication permissions.

Electronic devices, such as mobile phones have become part of many individuals' everyday life. Mobile phones are often carried in individuals' pockets, purses, briefcases, backpacks, satchels, etc., accompanying them wherever they go. This allows a user to send text messages, provide Facebook posts, surf the internet to check out news, scores, and gather information.

The electronic devices may include numerous applications, such as games, website applications, texting applications, calling applications, calendars, electronic mail (email) applications, etc. that may be utilized for entertainment, and to provide a user with information relevant to that user. Specifically, the user may select applications that interest the user for use, such that they desire to receive information related to the application when available.

Most applications allow configuration of push notifications for the purpose of providing a user information related to the application that may be relevant to the user. A push notification is an automated message sent by an application when the application is not being used by the application. Push notifications often come in forms of banners or flags that overlay as a user interfaces with the operating system (OS). Alternatively, notifications can include auditory notifications such as pinging when a text message is received, or ringing when a phone call is received. Notifications may also be haptic, such as for example, where a news alert from a certain website results in vibration of the electronic device.

Today, receiving notifications is either controlled at the application level or at the OS level with ability to toggle within the settings manually. Specifically, a user may provide inputs to manage the push notifications to avoid annoyance while utilizing their electronic device. In this manner, a user may block push notifications they do not desire to receive. So, if a user follows a news website and a football website, but does not want to receive a push notification on their screen every time breaking news occurs, but they do want to receive all push notifications updating the score of their favorite football team, the setting can be manually inputted accordingly.

Still, such manual inputs are static and simply do not account for the fact that life that can be very dynamic. For example, when an emergency event happens such as medical emergency, being in a car accident, etc., receiving push notifications can be undesired. Specifically, when an individual is attempting to call 911, loved ones, individuals to help with the emergency, receiving constant score updates, or messages that causing pinging, etc. can be stressful and annoying. Specifically, during such events, push notifications that would normally be welcome and make life more enjoyable, suddenly add stress and frustrations to what can already be a very stressful and frustrating situation.

SUMMARY

In accordance with embodiments herein, an electronic device is provided that includes a processor, and a data storage device having executable instructions accessible by the processor. Responsive to execution of the instructions, the processor receives candidate network based notifications. For each of the candidate network based notifications, the processor blocks communication of the candidate network based notifications to a user of the electronic device based on user permissions. The processor also obtains context data related to the user, modifies the user permissions based on the context data and determines a period for utilizing modified user permissions, and resets the user permissions after the period.

Optionally, to block communication of the candidate network based notifications to the user based on user permissions includes obtaining the user permissions from an input of the user, determining whether the candidate network based notifications comply with user permissions, and blocking publication of each of the candidate network based notifications that do not comply with the user permissions. In one aspect, the user permissions include at least one of an electronic mail based permission, a webpage update based permission, a calendar update based permission, or an advertisement based permission. In an example, the candidate network based notifications include at least one of a pop-up advertisement, calendar notification, or webpage specific notification.

Optionally, to modify the user permissions includes determining an event has occurred based on the context data, and automatically adding or subtracting at least one event based permission to or from the user permissions during the period in response to determining the event has occurred. In one example, to determine the period for utilizing modified user permissions includes at least one of utilizing a determined period, or calculating a period based on the event. Alternatively, responsive to execution of the instructions, the processor also monitors the context data after determining the event, and updates the period based on the context data monitoring after determining the event. In another aspect, responsive to execution of the instructions, the processor also publishes the candidate network based notifications on the electronic device based on the modification of the user permissions. In one embodiment, the context data includes at least one of data related to incoming or outgoing communications, data related to the candidate network notification, location data, or data inputted by the user into the electronic device. In another example, to block communication of the candidate network based notifications to the user on the electronic device includes changing a communication from an auditory communication to a haptic communication.

In accordance with embodiments herein, a method is provided where under control of one or more processors including program instructions to receive candidate network based notifications. For each of the candidate network based notifications, the one or more processors block communication of the candidate network based notifications to a user on an electronic device based on user permissions, and obtain context data related to the user. The one or more processors also modify the user permissions based on the context data and determine a period for utilizing modified user permissions, and reset the user permissions after the period.

Optionally, to block communication of the candidate network based notifications based on user permissions, the one or more processors obtain the user permissions from an input of the user, determine whether the candidate network based notifications comply with the user permissions, and block publication of each of the candidate network based notifications that do not comply with the user permissions. In one aspect, to modify the user permissions, the one or more processors determine an event has occurred based on the context data, and automatically add or subtract at least one event based permission to or from the user permissions during the period in response to determining the event has occurred. In one example, to determine the period for utilizing modified user permissions, the one or more processors at least one of utilize a determined period, or calculate a period based on the event. In another aspect, the one or more processors also monitor the context data after determining the event and update the period based on the context data monitoring after determining the event. In another embodiment, the one or more processors additionally publish the candidate network based notifications on the electronic device based on the modification of the user permissions. In one aspect, to block communication of the candidate network based notifications to the user on the electronic device includes changing a communication from an auditory communication to a haptic communication.

In accordance with embodiments herein, a computer program product is provided with a non-signal computer readable storage medium comprising computer executable code to receive candidate network based notifications. For each of the candidate network based notifications, the executable code blocks communication of the candidate networks based notifications to a user on an electronic device based on user permissions. The executable code also obtains context data related to the user, modifies the user permissions based on the context data and determine a period for utilizing modified user permissions, and resets the user permissions after the period.

Optionally, executable code also allows for monitoring the context data after determining an event, and updating the period based on the context data monitoring after determining the event. The executable code also allows for publishing the candidate network based notifications on the electronic device based on the modification of the user permissions.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "candidate network based notifications" refers to any and all communications received over a network from a remote electronic device or resource that may or may not be published onto an electronic device of a user based on permissions of the electronic device. Such candidate network based notifications include push notifications, emails, pop-up advertisements, banners or flags overlaying a display screen, application notifications such as game application notifications, news alerts, calendar reminders, application or electronic device updates, etc.

The term "permission" refers to a right or privilege that define access rights or communication rights to an electronic device. A permission may be manually provided through input from a user through a settings application, or otherwise. Alternatively, a permission may be provided by the electronic device or application manufacturer or creator and modified by a user or the electronic device. Example permissions include the right for a pop-up advertisement to be published on a display of the electronic device, the right of an email or push notification to be published on a display of the electronic device, including on a banner or flag of the display screen, the right of a calendar appoint to be published on a display screen, the right of a text message to be published or partially published on a display, the right of a call from a phone number to be received, the right of a pop-up advertisement, push notification, calendar appointment, or text message phone call, etc. to cause an auditory sound such as a ping, chime, or ring, when received, etc. User permissions include those manually input by a user, or provided in an electronic device upon receiving the electronic device from a manufacturer or application. Modified user permissions are user permissions that have been changed to either add or restrict permissions by the electronic device. For example, a user permission may be to permit an audible chime to occur when a text message is received, whereas a modified user permission is when the audible chime is not permitted based on modification by the electronic device upon determining the electronic device is in a library.

The term "event" refers to any happening that occurs that may result in modifying permissions of an electronic device. Events may include actions such as being in an accident, changing locations, being with a determined individual or individuals, being in a meeting, a planned changing of locations, a death in a family or to a pet, etc.

The term "publication" refers to displaying something on a display screen of an electronic device. The displaying may be over an entire display, a part of the display, on a banner or flag, as a pop-up, or the like. The displaying may include text, words, images, memes, partial text or images, etc.

The term "context data" refers to any and all data and information related to a user or electronic device that can be utilized to identify an event, the user, or subject matter associated with the event or user. Context data, can include images, voice recognition data, data within a storage device, location data, sensor obtained data, data inputted by a user, communication based data, or the like.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided for dynamically controlling the flow of notifications a primary electronic device permits to be received by a user based on events occurring to the user. In particular, each notification provided by an application on the primary electronic device is a candidate network based notification and communicated or not communicated to a user based on user permissions. The system monitors for context data to continuously determine if an event is occurring to the user where modification of the user permissions is warranted. Therefore, if a medical emergency, car accident, loss of a loved one, vacation plan, etc. is or has occurred, the system modifies the permissions to prevent or allow candidate network based notifications from being received based on the event. Then, after a period also determined by the system, the user permissions are reset back to their original settings.

Figure 1:
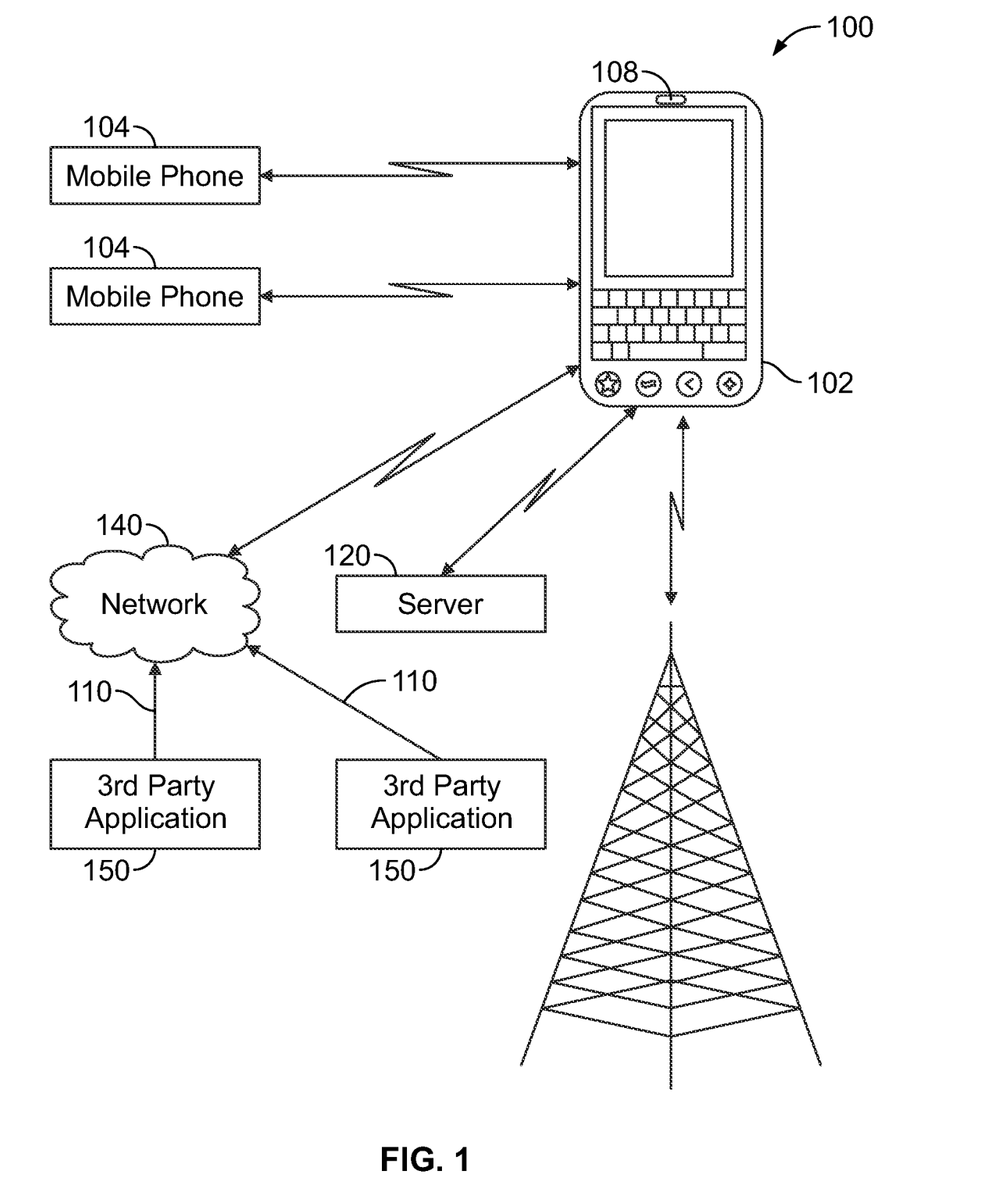
FIG. 1 illustrates a system for controlling communications, in accordance with embodiments herein.

FIG. 1 is a block diagram of a system 100 for controlling communication permissions in accordance with embodiments herein. The system 100 includes a primary electronic device 102, one or more secondary electronic devices 104, and one or more servers 120. By way of example, the primary electronic device 102 may be a mobile device, such as a cellular telephone, smartphone, tablet computer, personal digital assistant, laptop/desktop computer, gaming system, a media streaming hub device, IoT device, or other electronic terminal that includes a user interface and is configured to access a network 140 over a wired or wireless connection. As non-limiting examples, the primary electronic device 102 may access the network 140 through a wireless communications channel and/or through a network connection (e.g. the Internet). Additionally or alternatively, the primary electronic device 102 may be a wired or wireless communication terminal, such as a desktop computer, laptop computer, network-ready television, set-top box, and the like. The primary electronic device 102 may be configured to access the network using a web browser or a native application executing thereon. In some embodiments, the primary electronic device 102 may have a physical size or form factor that enables it to be easily carried or transported by a user, or the primary electronic device 102 may have a larger physical size or form factor than a mobile device.

The primary electronic device 102 additionally, includes numerous applications (FIG. 2) that may be utilized by the user to perform functions such as receiving information, ordering goods or services, storing information, communicating, etc. Such applications may include phone applications, text messaging applications, social networking applications, game applications, calendar applications, shopping applications, security applications, or the like. Each application may be on the primary electronic device 102 when received from a manufacturer, inputted onto the primary electronic device through a disk, input port, other medium, etc., downloaded through the network 140, or the like. Each application is a computer program product that comprises a non-signal computer readable storage medium and includes computer executable code to have the primary electronic device 102 to perform functions. Such functions can include retrieving information from a storage device, receiving data or information from one or more sensors 108, receiving information by accessing the network 140, including webpages on the network 140, communicating signals and data to communicate through the network 140, etc.

The primary electronic device 102 continuously receives candidate network based notifications 110 from the applications, including through the network 140, including from the secondary electronic devices 104 that are remote from the primary electronic device 102. The candidate network based notifications 110 include push notifications, emails, pop-up advertisements, notification to be displayed on banners or flags overlaying a display screen, application notifications such as game application notifications, news alerts, calendar reminders, application, or electronic device updates, etc.

The primary electronic device 102 also obtains context data. Context data includes any and all data and information related to a user or electronic device that can be utilized to identify an event, the user, or subject matter associated with the event or user. Context data, can include images, voice recognition data, data within a storage device, location data, sensor obtained data, data inputted by a user, communication based data, or the like. The primary electronic device 102 can utilize one or more sensors 110, voice recognition software, text recognition software, image recognition software, data within a storage device, etc. to obtain the context data. To this end, the context data can include phone numbers dialed, information in calendar appointments, information in emails, webpages, web searches, etc., individuals' names, voices, or images used to identify a user, communications received from secondary electronic devices, incoming communications, outgoing communications, etc.

The secondary electronic device 104 may represent the same or different type of device as the primary electronic device 102, such as a tablet computer, mobile phone, personal digital assistant, laptop/desktop computer and the like. In addition, other non-limiting examples of secondary electronic devices 104 include network devices (e.g. routers, hubs, etc.), a wearable device such as a smart watch or smart glasses, home automation electronic hubs (e.g. the Amazon Echo device), content management and streaming devices (e.g. the Chrome Cast device, Roku device, Kire TV stick device, Sonos devices), cameras, camcorders, drones, automobiles, GPS systems, audio content players and the like.

The primary electronic device 102 (and optionally the secondary electronic devices 104) are configured to communicate over the network 140 with various types of network electronic devices. The primary electronic device 102 is configured to access network electronic devices 150, including web-based or network-based data, applications, and services, via the network 140. The network 140 may represent one or more of a local area network (LAN), a wide area network (WAN), an Intranet or other private network that may not be accessible by the general public, or a global network, such as the Internet or other publicly accessible network.

In the example of FIG. 1, the primary electronic device 102 represents a cellular telephone that communicates with a cellular network 104 over one or more communications channels 142. The communication between the primary electronic device 102 and the cellular network may be unidirectional or bidirectional. A communications channel 142 may be provided by any communications provider, such as any source that disseminates information. The network 140 and communications channel 142 may be physically/logically separate channels. Optionally, the network 140 and communications channel 142 may be separate channels over the same underlying network.

Figure 2:
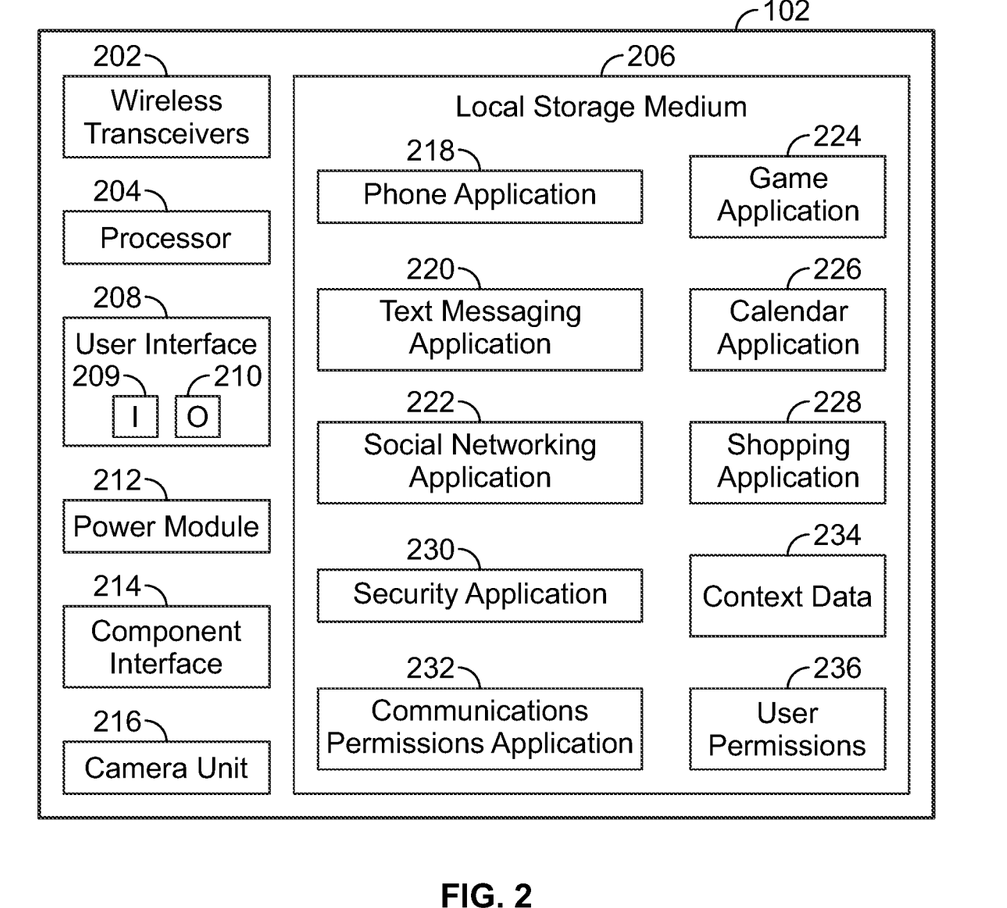
FIG. 2 illustrates an electronic device, in accordance with embodiments herein.

FIG. 2 illustrates a simplified block diagram of the primary electronic device 102 of FIG. 1 in accordance with an embodiment. The primary electronic device 102 includes components such as one or more wireless transceivers 202, one or more processors 204 (e.g., a microprocessor, microcomputer, application-specific integrated circuit, etc.), one or more local storage medium (also referred to as a memory portion) 206, a user interface 208 which includes one or more input devices 209 and one or more output devices 210, a power module 212, a component interface 214 and a camera unit 216. All of these components can be operatively coupled to one another, and can be in communication with one another, by way of one or more internal communication links, such as an internal bus. The camera unit 216 may capture one or more frames of image data.

Each transceiver 202 can utilize a known wireless technology for communication. Exemplary operation of the wireless transceivers 102 in conjunction with other components of the primary electronic device 102 may take a variety of forms and may include, for example, operation in which, upon reception of wireless signals, the components of primary electronic device 102 detect communication signals from secondary electronic devices 104 and the transceiver 202 demodulates the communication signals to recover incoming information, such as responses to inquiry requests, voice and/or data, transmitted by the wireless signals. The processor 104 formats outgoing information and conveys the outgoing information to one or more of the wireless transceivers 202 for modulation to communication signals. The wireless transceiver(s) 202 convey the modulated signals to a remote device, such as a cell tower or a remote server (not shown).

The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 210 may include a touch sensitive screen, a non-touch sensitive screen, a text-only display, a smart phone display, an audio output (e.g., a speaker or headphone jack), and/or any combination thereof.

The user interface 208 permits the user to select one or more of a switch, button or icon to collect context data, and/or enter context data. The user interface 208 can also direct the camera unit 216 to take a photo or video (e.g., capture image data). As another example, the user may select a context data collection button on the user interface 208 two or more successive times, thereby instructing the primary electronic device 202 to capture the context data.

The local storage medium 206 can encompass one or more memory devices of any of a variety of forms (e.g., read only memory, random access memory, static random access memory, dynamic random access memory, etc.) and can be used by the processor 204 to store and retrieve data. The data that is stored by the local storage medium 206 can include, but need not be limited to, operating systems, applications, obtained context data, and informational data. Each operating system includes executable code that controls basic functions of the device, such as interaction among the various components, communication with external devices via the wireless transceivers 202 and/or the component interface 214, and storage and retrieval of applications and context data to and from the local storage medium 206. Each application includes executable code that utilizes an operating system to provide more specific functionality for the communication devices, such as file system service and handling of protected and unprotected data stored in the local storage medium 206.

The local storage medium 206 stores various content including, but not limited to an phone application 218, text messaging application 220, social networking application 222, game application 224, calendar application 226, shopping application 228, security application 230, and an communication permissions application 232. In example embodiments, the social networking application may be Facebook, MySpace, or the like, the game application 224 may be Pokemongo, Wizards Unite, etc., the shopping application may be Amazon, Walmart, etc., and security application may be McAfee, Norton anti-virus, etc. While several applications 218-232 are listed, additional applications can be provided in other embodiments, including web conferencing applications, news applications, sports applications, stock market applications, exercise applications, airline applications, restaurant applications, movie applications, entertainment applications, etc. Specifically, applications are chosen on a user to user basis based on the interests of the user. Additionally, the local storage medium/memory 206 stores context data 234, user permissions 236, among other information such as device identifiers, network electronic device addresses, and the like.

The communication permissions application 232 obtains context data 234 that may be stored in the local storage medium/memory 206 to determine if a modification to user permissions 236 for a period are required. In particular, user permissions 236 may be set by a manufacturer of the primary electronic device 102 related to applications that are already on the primary electronic device 102. Such applications may include the phone application 218, the text application 220, and security application 230. The stored user permissions 236 in examples include when the phone application 218 receives a call from all numbers the phone is to audibly ring and provide a haptic response such as vibrating, for all text messages received by the text application 220 a flag or banner with one hundred characters of text should be displayed at the top of an output device 210 such as a display and an audible ping should be provided, and for all security updates received by the security application 230, a full screen pop-up should be provided with no audible sound. To this end, user permissions include electronic mail based permission, a webpage update based permission, a calendar update based permission, an advertisement based permission, etc. These include pop-up advertisements, calendar notification, webpage specific notifications, or the like.

Once the primary electronic device 102 is received by a user, the user may manually modify the user permissions 236 set by a manufacturer. The user may set the phone application 218 to block certain phone numbers and only vibrate when a call is received, the text application 220 may similarly be modified to block certain numbers, while the security application 230 may be modified to only permit a flag or banner at the top of the display for providing update information. In addition, the user may add the additional applications including the social networking application 222, game application 224, calendar application 226, shopping application 228, and communication permissions application 232. Such applications may be installed, downloaded, etc. Then the user may provide permissions related to each. In one example, the permissions prevent candidate network based notifications such as push notifications from the social networking application 222 and shopping application 228, while a push notification in the form of a banner at the top of the display is allowed for the game application 224, and calendar application 226. In other examples, such permission settings may vary, including which application is allowed to provide push notifications compared to those that do not, and the type of alert or message received to provide the push notification. In particular, the push notification may allow a display based notification for one push notification, an auditory notification for another, and a haptic, or vibration notification for yet another. More than one notification method similarly may be provided.

The communication permissions application 232 continuously receives context data 234 to dynamically determine if modifications should be made to the user permissions 236 as a result of an event. For example, if an individual is in a car accident, the communication permissions application 232 receives context data that 911 was called by the electronic device, voice recognition recognizes that the words accident, or wreck are being utilized, GPS data shows that the electronic device had been moving at 50-60 mph and has suddenly stopped moving, etc., an insurance company has been called, etc. Based on this context data 234, a determination is made that an event that is a car accident has occurred. Because of the event, the communication permissions application 232 modifies the user permissions 236 to block candidate network based notifications such as push notification communications from the game application 224 and calendar application 226, even though the settings normally allow such push notifications. As the same time, the communication permissions application 232 may change permissions to change text messages being received to cause an audible sound such as a ping to being haptic and vibrating. In this manner, the ping is blocked, though vibration is still allowed. In addition, the communication permissions application 232 may modify the phone application 218 setting from no candidate network based notifications, or ringing, to audible ringing. In this manner, if a loved one is trying to get a hold of the person in the accident, their primary electronic device 102 provides an audible noise to provide such an alert. Additionally, only text and calls from certain phone numbers, such as loved ones, may result in the audible noise to be provided. Additionally, a period may be determined so that for one hour after an emergency type event such as an accident occurs, the modified settings will remain before resetting to the previous permission settings. Alternatively, the communication permissions application 232 continuously receives context data, and if an indication is provided through GPS or otherwise that the individual is headed to a hospital, the period may be extended by a set period, such as six hours, or until an hour after the primary electronic device 102 has left the hospital.

In another example, context data 234 is received by the communication permissions application 232 indicating an individual is in a library. Such context data 234 may be received from a calendar appointment that indicates "studying in library" from 6-8 PM, a text message to a friend that states "in the library now", a GPS device that indicates an individual is in a library, etc. From the context data 234, a determination is made that all audible settings for communications received from any of the applications 218-232 is to be blocked and changed to a haptic, vibration setting. Similarly, candidate network based notifications such as push notifications from sports applications, news applications, social network applications, entertainment applications, etc. that could be a distraction during studying could be completely blocked and prevented from being received. This modified setting may be provided for a period from 6-8 PM based on the context data received from the calendar application before resetting.

In yet another example, context data 234 received by the communication permissions application 232 may indicate that a pet has just died. Calendar data may indicate a vet appointment, while a text received may indicate "sorry to hear about your dog". Based on the context data 234, the communication permissions application 232 may monitor candidate network based notifications such as push notifications, pop-up advertisements, or the like that are permitted to be received by the user for content. Content may include text read by a text translator, images viewed by image recognition software, etc. to determine if the candidate network based notifications is about an animal. If the candidate network based notifications is about an animal, the communication permission application 232 blocks the candidate network based notifications so the user does not need to see the candidate network based notifications about an animal at that time. The communication permission application 232 may provide a period of a week before resetting the permissions to allow such candidate network based notifications.

In yet another example, context data 234 is received by the communication permission application 232 that the user is taking a trip to Ireland in two weeks. The context data 234 includes the on-line purchase of airline tickets to Ireland through an airline application during the dates of the vacation, and recent web searchers for things to do when vacationing in Ireland. In this example, the user has permission settings that are to block all candidate network based notifications such as push notifications from a news application. However, for a period of two weeks before the vacation, the communications permission application 232 monitors all push notifications from the news application, and allows push notifications related to Ireland to be received on the display of the primary electronic device 102.

Figure 3:
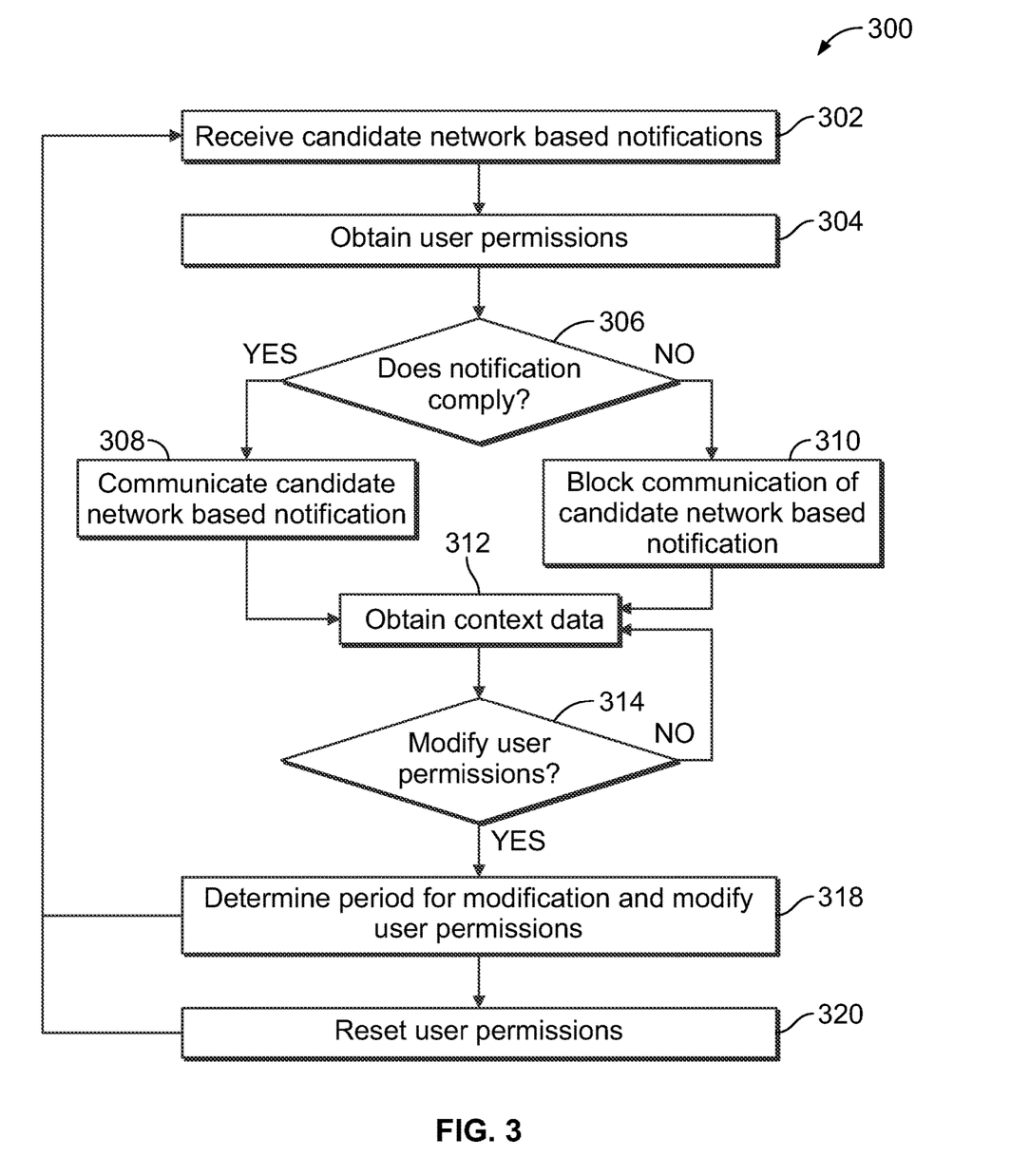
FIG. 3 illustrates a process for controlling communication, in accordance with embodiments herein.

FIG. 3 illustrates a block diagram of a process 300 for controlling communication in accordance with embodiments herein. In one example, the system and electronic device of FIGS. 1 and 2 are utilized for implementing the process.

At 302, one or more processors receive candidate network based notifications. The candidate network based notifications can be push notifications, pop-up advertisements, appointment reminders, etc. received from one or more system applications as described herein. Each network based notification is a candidate to be communicated through publication, or otherwise, to a user of a primary electronic device based on permissions of the primary electronic device.

At 304, the one or more processors obtain the user permissions for each of the candidate network notifications. The user permissions define the content and information that a user desires to be informed about from applications. The permissions can be set by a manufacturer of a primary electronic device, by a creator of an application, or manually input by the user. In particular, the permission settings may be changed by a user at any time.

At 306, the one or more processors determine whether the candidate network based notifications comply with user permissions. This determination may be made by utilizing a look-up table, reviewing the text, images, etc. of the candidate network based notification, or the like.

If at 306, the one or more processors determine that the candidate network based notifications comply with user permissions, at 308, the one or more processors communicate the candidate network based notification to the user. The one or more processors may communicate the candidate network based notification by a published communication on a display, partially on a screen, on a banner or flag on a screen, by an auditory communication via a chime, ding, ring, or other sound, by a haptic communication through a vibration, pulse, or other movement, or the like. If at 306, the one or more processors determine the candidate network based notification does not comply with the user permissions, then at 310, the one or more processors block communication of the candidate network based notification. The one or more processors may block any form of communication, including publication, auditory communication, haptic communication, a combination thereof, or the like. In one example, the communication may be changed from an auditory communication to a haptic communication to block the auditory communication.

At 312, the one or more processors obtain context data related to the user. Context data can be obtained from applications, sensors, a storage device, manual inputs of the user, incoming communications, outgoing communications, or the like. The context data is continuously obtained by the one or more processors and may be saved or analyzed for a determined period of time.

At 314, the one or more processors determine whether to modify the user permissions based on the context data. Based on the context data, a model, algorithm, look-up table, decision tree, function, or the like may be utilized to determine when the context data is indicating that an event has occurred that requires temporary modification of the user permissions. The event can be an accident, medical emergency, activity such as studying, attending a meeting, attending a movie, etc., a trip, a death, etc. that would cause a desire for dynamic modification of the communication permissions of a primary electronic device. At 314, if user permissions do not require modification, then the one or more processors continue obtaining context data to determine if modification is appropriate at a later time.

If at 314, modification is desired, at 318 the one or more processors determine a period for modification, and modify the user permissions based on the context data. The period of time for the modification may be a determined time, such as one hour for all determined events. Alternatively, the period may depend on the type of event. For accidents, the period may be one hour, for medical emergencies the period may be twelve hours, for a death of a family member or pet the period may be a week, etc. The period may also be determined based on the context data. If studying is planned in a calendar application for two hours, the period will be two hours. Alternatively, as the one or more processors obtain more context data, the period may change. Such that if an individual is in an accident, the period may be an hour, but if a determination is later made, that the user is suffering a medical emergency due to the accident, the period may be extended to twelve hours.

At 320, the one or more processors reset the user permissions after the period has lapsed. In particular, the modification of the permissions is dynamic, and only temporary for when an individual is experiencing an event. By resetting the permissions, when an individual is going through an event, they do not have to be annoyed with undesired communications, and also do not have to remember to change permission settings back to an original setting. As a result, stress may be reduced during an event.

Figure 4:
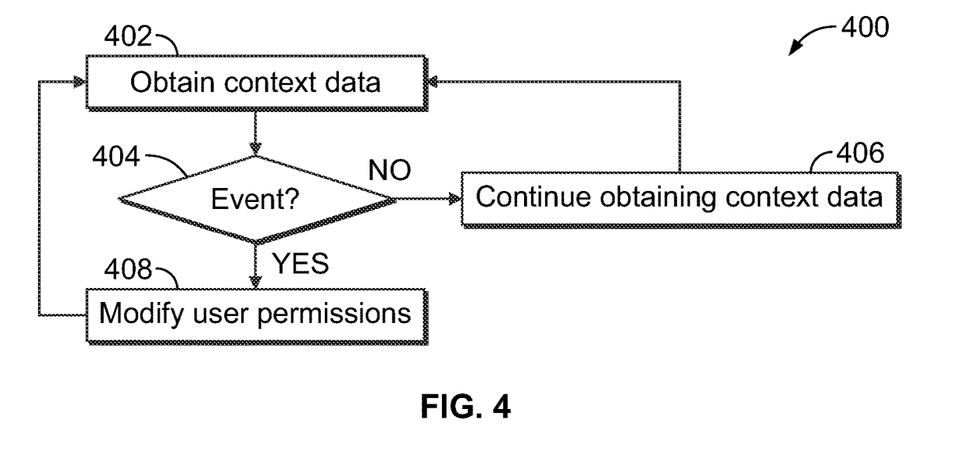
FIG. 4 illustrates a process for modifying user permissions, in accordance with embodiments herein.

FIG. 4 illustrates a block diagram of a process 400 for modifying user permissions of a primary electronic device in accordance with embodiments herein. In one embodiment, the process 400 may be accomplished by the system or primary electronic device of FIGS. 1-2. In another embodiment, the process 400 may be utilized to accomplish operations 314-316 of the process of FIG. 3.

At 402, one or more processors obtain context data. The context data may be obtained in any manner previously described herein.

At 404, the one or more processors determine if an event has occurred based on the context data. As discussed above, the event can be an accident, medical emergency, activity such as studying, attending a meeting, attending a movie, etc., a trip, a death, etc. that would cause a desire for dynamic modification of the user permissions of a primary electronic device. For example, a storage device may include a list of phone numbers in a look up table that when dialed by the user automatically causes the determination of an event. Such phone numbers can include 911, a police department, a fire station, a hospital, etc. In another example, the launching of an application may be an event. Thus, if any phone call gets made, or a conference call application launches, etc. the determination is automatically made that an event is occurring that requires the changing of user permissions. Alternatively, certain terms, phrase, etc. within calendars, text messages, email messages, or the like, may be utilized in association with a model during a given period to determine that an event has occurred. Such terms may be studying, library, meet me at the library, homework, book, etc. The determination may be made by looking for certain words or phrases in social network applications, text applications, or email applications such as "we had to put our dog to sleep", "I'm sad today because my friend passed away", or the like. Utilizing any of these methodologies can result in the determination that an event has occurred based on the context data.

If at 404, an event has not occurred, at 406, the one or more processors continues monitoring, and obtaining context data. Monitoring includes utilizing one or more sensors to obtain context data, along with reviewing and analyzing context data obtained for obtaining addition context data. If at 404, an event has been determined, at 408, the one or more processors modifies the user permissions based on the context data. In particular, the one or more processors automatically add or subtract at least one event based permission to or from the user permissions during a period. In particular, such addition or subtraction is done without any interaction from the user. In one example, if a health emergency occurs and an individual in the proximity of the user is having a heart attack, the user may call 911. Based on calling 911, the one or more processors automatically determine a medical event has occurred. At this time, push notifications from an entertainment application may be blocked. In this manner, the restriction of the push notification from the entertainment application is a subtracted event based permission because such communications are not allowed during the period. Alternatively, if a determination is made that a user is going to a rock concert featuring their favorite band in a week, the rock concert is determined to be an event, and push notifications related to the user's favorite band from an entertainment application that typically are blocked may be permitted to be communicated to the user. In this manner, an added event based permission is provided.

Figure 5:
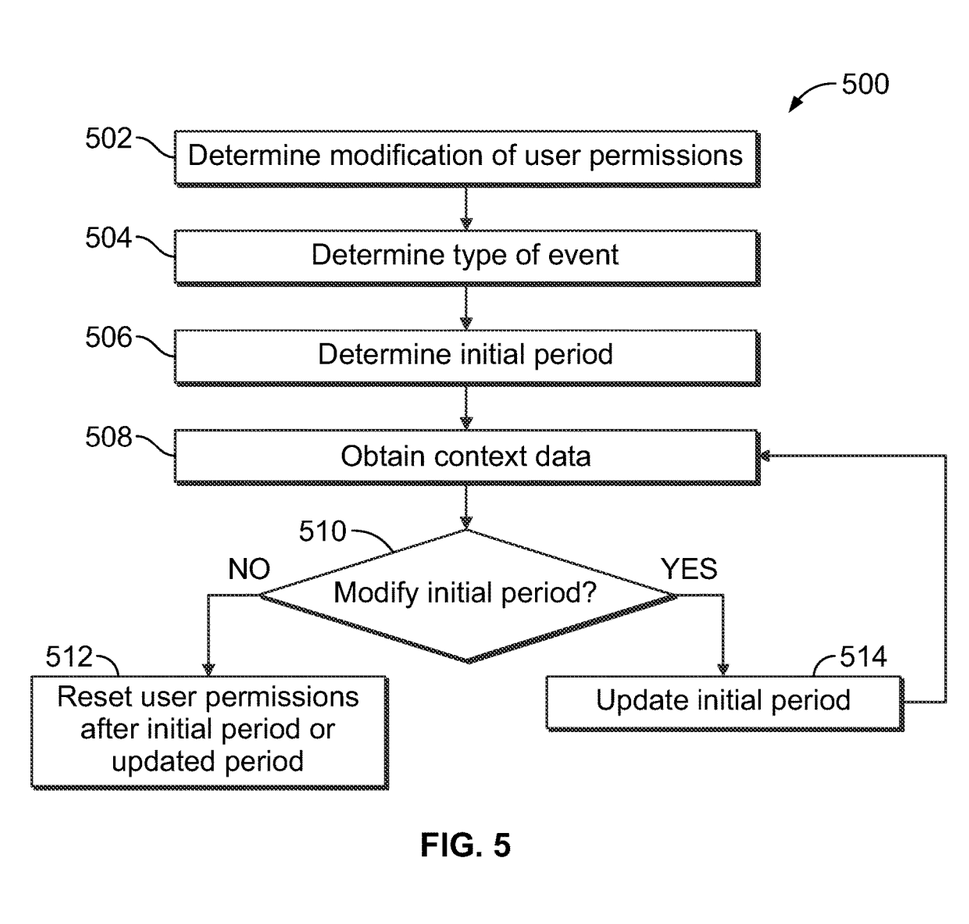
FIG. 5 illustrates a process for determining a period before resetting user permissions, in accordance with embodiments herein.

FIG. 5 illustrates a block diagram of a process 500 for determining a period before resetting user permissions in accordance with embodiments herein. In one example, the system or primary electronic device of FIGS. 1 and 2 implement the process 500. In another embodiment, the process 500 is utilized to accomplish operation 318 of FIG. 3.

At 502, one or more processors determine modification of user permissions is required. In particular, any method or process as described above are utilized to determine that modification is required.

At 504, the one or more processors determine the type of event that has occurred based on the context data. In one example, the communication permission application may include a look up table that includes a list of determined events. Determined events may be a medical emergency event, an accident, a death, bad news related to specific individuals or pets, study sessions, sporting events, music concerts, upcoming vacations or trips, meetings, teleconferences, etc. Based on the context data the type of event is determined. As indicated above, if 911 is called a medical emergency may automatically be determined. Alternatively, look up tables, decision trees, algorithms, mathematical models, or the like may be utilized on words, phrases, images, sources, voices, schedules, other context data, etc. to determine the type of event. In one example, if the type of event cannot be determined, the type of event is considered to be "other".

At 506, the one or more processors determine an initial period of time associated with the modified user permissions. The initial period of time may be a determined period that is static based on the event. As described above, for accidents, the period may be one hour, for medical emergencies the period may be twelve hours, for a death of a family member or pet the period may be a week, etc. For events where a determination cannot be made how to classify the event, a two hour period can be provided. Alternatively, the period could be less or more than two hours. Such period may be in a look-up table such that once the type of event is determined, a set initial time period is provided. Alternatively, the period of time may be calculated based on the context data. In an embodiment where user permissions are modified to allow push notification related to a rock concert the user is attending, the context data may include the date and start time of the concert. From this, four hours may be added to the start time of the concert, and the period of time can be from one week before a concert begins to the four hours after the end of the concert. Alternatively, context data may indicate a period for an event, and such data may be utilized to determine the initial period of time.

At 508, the one or more processors continue to obtain context data. In particular, just because an event has been determined to be occurring, or determined to be occurring in the future, does not mean the event does not change. A student can decide not to go study, a game can be cancelled, etc. As a result, more information about an event can be obtained that can result in changes in the period of time for modification of user permissions, or eliminate the need to modify user permissions.

At 510, a determination is made if the initial period should be modified. If at 510, no new context data is obtained that causes a need for a modification, then at 512, the one or more processors reset the user permissions after the initial period end. However, if at 510 the obtained context data indicates the initial period should be modified, then at 514 the one or more processors update the initial period to be an updated period. For example, if an individual is in an accident and the user is severely injured with broken bones, but is able to call the police, the one or more processors can determine the individual has been in an accident based on the call to the police. Because an accident is determined, the initial period for modifying user permissions may be one hour. However, because 911 was not called, the one or more processors does not determine that a medical emergency has also occurred. So, as the one or more processors continue obtaining context data, a text to a loved one stating the user is headed to the hospital, or GPS data indicating movement to a hospital can result in a determination that a medical emergency is occurring. At this time, the one or more processors provide an updated time of twelve hours because a medical emergency has occurred. In this manner, the period of time may be modified based on the context data to better reflect the dynamic changes occurring to the user. After updating the initial period, the one or more processors continue obtaining context data at 508 and determining if the initial period, or the most recent updated period should be modified until the most recent updated period lapses. In this manner, the system provides modified user permissions only during certain periods and resets to reduce stress and provide convenience for the user.

As will be appreciated, various aspects may be embodied as a system, method or computer (device) program product.

Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:
1. An electronic device comprising:
a processor;
a data storage device having executable instructions accessible by the processor;

wherein, responsive to execution of the instructions, the processor to:
  receive candidate network based notifications;
  for each of the candidate network based notifications, block communication of the candidate network based notifications to a user of the electronic device based on user permissions;
  obtain context data related to the user;
  modify the user permissions based on the context data and determine a period for utilizing modified user permissions; and
  reset the user permissions after the period.

2. The electronic device of claim 1, wherein to block communication of the candidate network based notifications to the user based on user permissions comprises:
  obtaining the user permissions from an input of the user;
  determining whether the candidate network based notifications comply with user permissions; and
  blocking publication of each of the candidate network based notifications that do not comply with the user permissions.

3. The electronic device of claim 2, wherein the user permissions include at least one of an electronic mail based permission, a webpage update based permission, a calendar update based permission, or an advertisement based permission.

4. The electronic device of claim 1, wherein the candidate network based notifications include at least one of a pop-up advertisement, calendar notification, or webpage specific notification.

5. The electronic device of claim 1, wherein to modify the user permissions comprises:
  determining an event has occurred based on the context data; and
  automatically adding or subtracting at least one event based permission to or from the user permissions during the period in response to determining the event has occurred.

6. The electronic device of claim 5, wherein to determine the period for utilizing modified user permissions comprises at least one of utilizing a determined period, or calculating a period based on the event.

7. The electronic device of claim 5, wherein responsive to execution of the instructions, the processor further to:
  monitor the context data after determining the event; and
  update the period based on the context data monitoring after determining the event.

8. The electronic device of claim 1, wherein responsive to execution of the instructions, the processor further to: publish the candidate network based notifications on the electronic device based on the modification of the user permissions.

9. The electronic device of claim 1, wherein context data includes at least one of data related to incoming or outgoing communications, data related to the candidate network based notification; location data, or data inputted by the user into the electronic device.

10. The electronic device of claim 1, wherein to block communication of the candidate network based notifications to the user on the electronic device includes changing a communication from an auditory communication to a haptic communication.

11. A method, comprising:
  under control of one or more processors including program instructions to:
    receive candidate network based notifications;
    for each of the candidate network based notifications, block communication of the candidate network based notifications to a user on an electronic device based on user permissions;
    obtain context data related to the user;
    modify the user permissions based on the context data and determine a period for utilizing modified user permissions; and
    reset the user permissions after the period.

12. The method of claim 11, wherein to block communication of the candidate network based notifications based on user permissions, under the control of the one or more processors further including program instructions to:
  obtain the user permissions from an input of the user;
  determine whether the candidate network based notifications comply with the user permissions; and
  block publication of each of the candidate network based notifications that do not comply with the user permissions.

13. The method of claim 11, wherein to modify the user permissions, under the control of the one or more processors further including program instructions to:
  determine an event has occurred based on the context data; and
  automatically add or subtract at least one event based permission to or from the user permissions during the period in response to determining the event has occurred.

14. The method of claim 13, wherein to determine the period for utilizing modified user permissions, under the control of the one or more processors further including program instructions to: at least one of utilize a determined period, or calculate a period based on the event.

15. The method of claim 13, wherein under the control of the one or more processors further including program instructions to:
  monitor the context data after determining the event; and
  update the period based on the context data monitoring after determining the event.

16. The method of claim 11, wherein under the control of the one or more processors further including program instructions to: publish the candidate network based notifications on the electronic device based on the modification of the user permissions.

17. The method of claim 11, wherein to block communication of the candidate network based notifications to the user on the electronic device includes changing a communication from an auditory communication to a haptic communication.

18. A computer program product comprising a non-signal computer readable storage medium comprising computer executable code to:
  receive candidate network based notifications;
  for each of the candidate network based notifications, block communication of the candidate networks based notifications to a user on an electronic device based on user permissions;
  obtain context data related to the user;
  modify the user permissions based on the context data and determine a period for utilizing modified user permissions; and
  reset the user permissions after the period.

19. The computer program product of claim 18, the computer executable code to:
  monitor the context data after determining an event; and
  update the period based on the context data monitoring after determining the event.

20. The computer program product of claim 18, the computer executable code to:
 publish the candidate network based notifications on the electronic device based on the modification of the user permissions.

\* \* \* \* \*